(12) United States Patent
Dayama et al.

(10) Patent No.: US 11,163,297 B2
(45) Date of Patent: Nov. 2, 2021

(54) IDENTIFYING EQUIPMENT OPERATING CONTROL SETTINGS USING HISTORICAL INFORMATION

(71) Applicant: International Business Machines Corporation, Armonk, NY (US)

(72) Inventors: Pankaj S. Dayama, Bangalore (IN); Prabuchandran Krithivasan Jayachandran, Bangalore (IN); Nitin Singh, Bangalore (IN); Vinayaka Pandit, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 269 days.

(21) Appl. No.: 16/128,138

(22) Filed: Sep. 11, 2018

(65) Prior Publication Data
US 2020/0081421 A1 Mar. 12, 2020

(51) Int. Cl.
*G05B 19/418* (2006.01)

(52) U.S. Cl.
CPC ... *G05B 19/41875* (2013.01); *G05B 19/4187* (2013.01); *G05B 19/41815* (2013.01)

(58) Field of Classification Search
CPC ............. G05B 19/41815; G05B 19/4187
See application file for complete search history.

(56) References Cited

U.S. PATENT DOCUMENTS 9,008,807 B2 4/2015 Shapiro et al.
9,729,639 B2 8/2017 Sustaeta et al.
(Continued)

FOREIGN PATENT DOCUMENTS

WO WO2016160913 A1 10/2016

OTHER PUBLICATIONS

Bonavita, Nunzio et al., "Operational Performance Excellence Through Production Optimization in the Upstream Industry", 10th Mediterranean Petroleum Conference (MPC08), Feb. 26-28, 2008, Tripoli, Libya, 11 pages.
(Continued)

*Primary Examiner* — Matthew G Marini
(74) *Attorney, Agent, or Firm* — Ference & Associates LLC

(57) ABSTRACT

One embodiment provides a method, including: obtaining historical information for equipment having at least one control, wherein the historical information indicates a setting for the at least one control during operation of the equipment and identifies operating performance of the equipment corresponding to the indicated setting; receiving a goal for the equipment, wherein the goal is related to a desired operating performance of the equipment; identifying, a plurality of sets of contiguous good reference segments, wherein a contiguous set of good reference segments comprises a plurality of operating time segments where the desired operating performance goal was achieved for a predetermined of time; identifying, a subset of sets comprising reference segments that are achievable from a current operating state of the equipment; selecting, a reference segment that is attainable based upon exogenous factors related to an operating environment of the equipment; and providing a recommendation to an operator of the equipment.

18 Claims, 4 Drawing Sheets

(56) References Cited

U.S. PATENT DOCUMENTS

| | | | | |
|---|---|---|---|---|
| 2007/0088550 A1* | 4/2007 | Filev | ............ | G06K 9/6298 |
| | | | | 704/245 |
| 2011/0313726 A1* | 12/2011 | Parthasarathy | ...... | G05B 23/024 |
| | | | | 702/179 |
| 2016/0116892 A1* | 4/2016 | Cheng | ............ | G06F 11/079 |
| | | | | 700/108 |

OTHER PUBLICATIONS

Seborg, Dale E. et al., "Process Dynamics and Control", Book, 2004, 732 Pages, John Wiley & Sons, Inc.

Qin, S. Joe et al., "A survey of industrial model predictive control technology", Control Engineering Practice, 2002, 32 pages, Science Direct, Elsevier Science Ltd.

Limon, D. et al., "MPC for tracking periodic reference signals", 4th IFAC Nonlinear Model Predictive Control Conference, International Federation of Automatic Control, Aug. 23-27, 2012, Noordwijkerhout, Netherlands, 6 pages, IFAC.

MATLAB, "Schedule Controllers at Multiple Operating Points", Accessed on Jun. 22, 2018, 14 pages, MATLAB & Simulink—MathWorks India.

MATLAB, "Gain-Scheduled MPC", Accessed on Jun. 22, 2018, 2 pages, MATLAB & Simulink—MathWorks India.

Qin, S. Joe et al., "An Overview of Nonlinear Model Predictive Control Applications", Progress in Systems and Control Theory, 2000, 24 pages, vol. 26, Birkhauser Verlag Basel/Switzerland.

\* cited by examiner

IDENTIFYING EQUIPMENT OPERATING CONTROL SETTINGS USING HISTORICAL INFORMATION

BACKGROUND

Many entities have machines and equipment that are used to make products or perform tasks. These machines generally have many different settings that are controlled in order to make a product or perform a task within particular quality thresholds. For example, a machine making a widget may include controls that allow for changing settings of the machine to affect the size, smoothness, and other qualities of the widget. The equipment may also include a control that allows for control of equipment settings, for example, energy efficiency, product throughput, operating time, and the like. These machines usually allow an operator to identify one or more goals (e.g., a desired throughput, a desired energy efficiency, a desired product smoothness, etc.) and then the machine will control the variables or settings of the controls to reach the desired goal.

BRIEF SUMMARY

In summary, one aspect of the invention provides a method comprising: obtaining historical information for equipment having at least one control that controls an operational setting of the equipment, wherein the historical information indicates a setting for the at least one control during operation of the equipment and identifies operating performance of the equipment corresponding to the indicated setting; receiving a goal for the equipment, wherein the goal is related to a desired operating performance of the equipment; identifying, from the obtained historical information, a plurality of sets of contiguous good reference segments, wherein a contiguous set of good reference segments comprises a plurality of operating time segments where the desired operating performance goal was achieved for a predetermined of time; identifying, from the identified plurality of sets, a subset of sets comprising reference segments that are achievable from a current operating state of the equipment; selecting, from the identified subset, a reference segment that is attainable based upon exogenous factors related to an operating environment of the equipment; and providing a recommendation to an operator of the equipment, wherein the recommendation identifies a setting for the control to obtain the goal, the setting being determined from the selected reference segment.

Another aspect of the invention provides an apparatus, comprising: at least one processor; and a computer readable storage medium having computer readable program code embodied therewith and executable by the at least one processor, the computer readable program code comprising: computer readable program code configured to obtain historical information for equipment having at least one control that controls an operational setting of the equipment, wherein the historical information indicates a setting for the at least one control during operation of the equipment and identifies operating performance of the equipment corresponding to the indicated setting; computer readable program code configured to receive a goal for the equipment, wherein the goal is related to a desired operating performance of the equipment; computer readable program code configured to identify, from the obtained historical information, a plurality of sets of contiguous good reference segments, wherein a contiguous set of good reference segments comprises a plurality of operating time segments where the desired operating performance goal was achieved for a predetermined of time; computer readable program code configured to identify, from the identified plurality of sets, a subset of sets comprising reference segments that are achievable from a current operating state of the equipment; computer readable program code configured to select, from the identified subset, a reference segment that is attainable based upon exogenous factors related to an operating environment of the equipment; and computer readable program code configured to provide a recommendation to an operator of the equipment, wherein the recommendation identifies a setting for the control to obtain the goal, the setting being determined from the selected reference segment.

An additional aspect of the invention provides a computer program product, comprising: a computer readable storage medium having computer readable program code embodied therewith, the computer readable program code executable by a processor and comprising: computer readable program code configured to obtain historical information for equipment having at least one control that controls an operational setting of the equipment, wherein the historical information indicates a setting for the at least one control during operation of the equipment and identifies operating performance of the equipment corresponding to the indicated setting; computer readable program code configured to receive a goal for the equipment, wherein the goal is related to a desired operating performance of the equipment; computer readable program code configured to identify, from the obtained historical information, a plurality of sets of contiguous good reference segments, wherein a contiguous set of good reference segments comprises a plurality of operating time segments where the desired operating performance goal was achieved for a predetermined of time; computer readable program code configured to identify, from the identified plurality of sets, a subset of sets comprising reference segments that are achievable from a current operating state of the equipment; computer readable program code configured to select, from the identified subset, a reference segment that is attainable based upon exogenous factors related to an operating environment of the equipment; and computer readable program code configured to provide a recommendation to an operator of the equipment, wherein the recommendation identifies a setting for the control to obtain the goal, the setting being determined from the selected reference segment.

A further aspect of the invention provides a method, comprising: obtaining historical information of equipment identifying (i) settings for controls that control operational settings of the equipment and (ii) operating parameters of the equipment corresponding to the identified settings; receiving an operating parameter goal for the equipment; grouping the historical information into performance groups based upon the identified operating parameter goal; identifying a subset of the grouped segments (i) corresponding to desired performance and (ii) corresponding to segments that are reachable from a current operating state of the equipment; and providing a recommendation for a setting for the control based upon the operating parameter goal, wherein the providing a recommendation comprises selecting a segment from the identified subset that is attainable based upon operating environment factors of the equipment.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
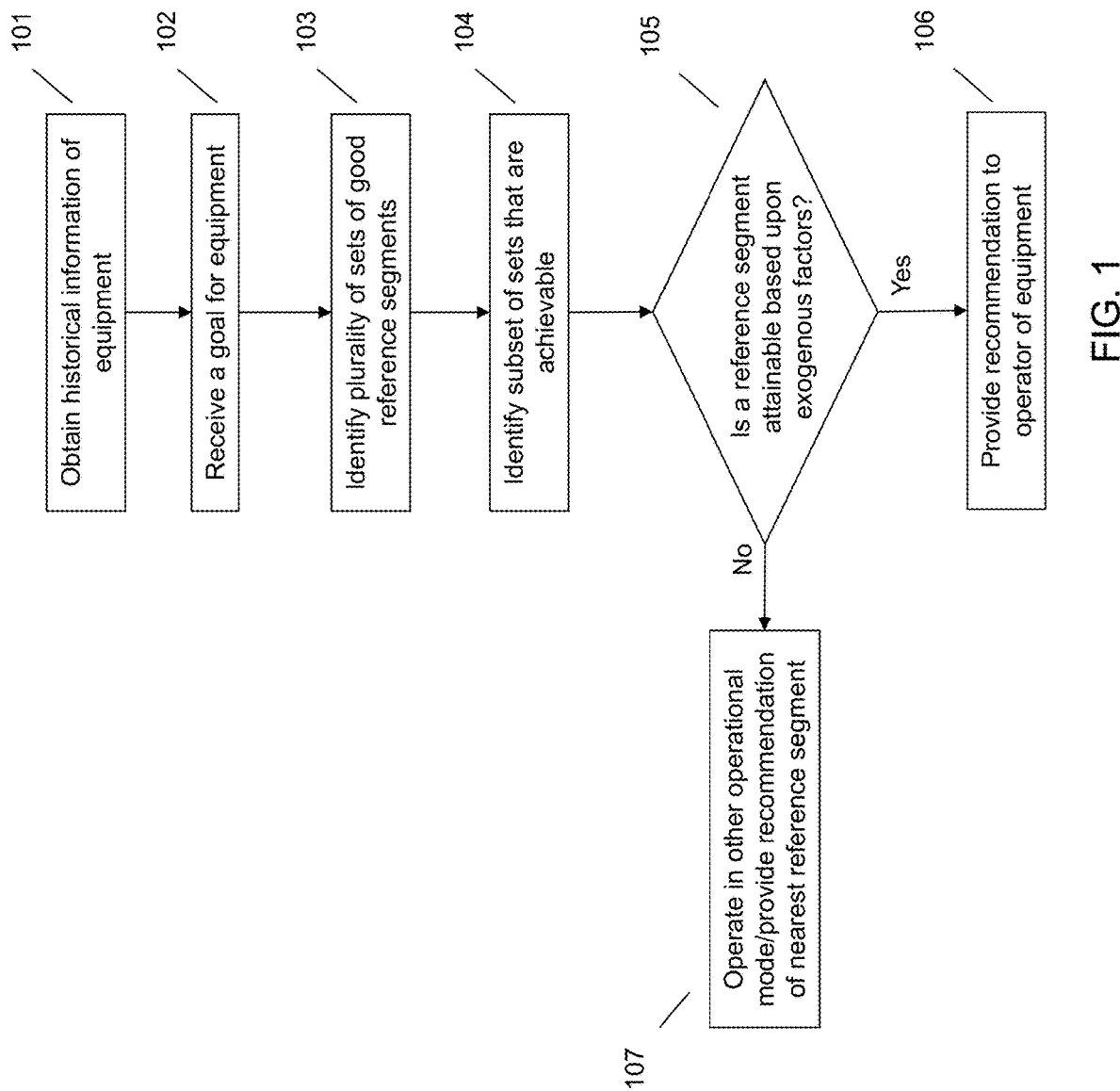
FIG. 1 illustrates a method of recommending a setting for a control based upon historical information.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

One problem with machines or equipment running in automatic mode, a mode where the machine chooses control settings to meet a particular goal, is that the machine may select settings that do not actually met the desired goal. One reason for this is that these reference points are chosen by the machine based upon the attributes of the optimal version of the machine. These set points are generally obtained by solving offline optimization problems based upon the attributes of the machine. In other words, the reference points are based upon the attributes of the machine (e.g., model, manufacturer year, etc.) and do not take into account any attributes related to the operating environment of the machine (e.g., operating region, operating climate, upstream machine attributes, downstream machine attributes, availability of machine materials, etc.). This results in reference points that may not be optimal for the machine in the operating environment of the machine.

To account for these deficiencies in the automatic mode, the machines or equipment generally come equipped with a manual mode that allows operators to manually control the settings for the controls. The operators generally select these settings based upon experience with and knowledge about the machines and products produced by the machines. However, based solely on the experience and knowledge of the operator, the equipment, and product attributes may not end up meeting the desired goals of the operator or manufacturing facility. Additionally, because the equipment and product attributes are generally based upon multiple control set points, it may be difficult for even the most experienced operator to identify optimal set points for each and every control that may affect the desired equipment or product attribute. Additionally, both the automatic and manual modes are unable to account for exogenous factors related to the operating environment of the machine.

Accordingly, the techniques and systems as described herein provide a system and technique for recommending a setting for a control based upon historical information. The system may obtain historical information for equipment that has one or more controls that control operational settings of the equipment. The historical information identifies the settings of the controls while the equipment was in operation. The historical information also identifies the operating performance and attributes of the equipment while the settings were employed. In other words, the historical information identifies the attributes of the equipment and the produced products based upon those control settings.

The system may also receive a goal for the equipment that identifies a desired operating performance of the equipment, which also includes a desired attribute of the product. From the historical information, the system can identify multiple sets of contiguous good reference segments. A good reference segment includes a reference segment where the desired operating performance was achieved. A set of contiguous good reference segments includes a plurality of good reference segments that occur over a predetermined period of time. From these multiple sets of contiguous reference segments, the system can identify a subset that are achievable from a current operating state. In other words, based upon a current operating state of the equipment it may not be possible to move the controls to achieve the operational settings represented by every reference segment. Thus, the system identifies those reference segments that are achievable. From the achievable reference segments, the system selects a reference segment that is attainable based upon exogenous factors related to an operating environment of the equipment. The system may then provide a recommendation to an operator of the equipment that identifies a setting for the control to obtain the goal based upon the reference segment that is identified as attainable.

Such a system provides a technical improvement over current systems for controlling machine control set points. The described systems and methods provide a system that can recommend control set points or settings for equipment based upon historical information, thereby providing a system that can identify control set points that are attainable based upon current settings of the equipment even taking into account exogenous factors, which is not possible using the traditional techniques. The traditional techniques are based upon optimal machine characteristics and operator experience which result in equipment and product attributes that do not achieve the desired goal or operating condition. In other words, the traditional systems provide no systematic way to analyze past data and take into account current exogenous factors to recommend control set points and other recommendations to operators based upon goals of the operator, which are provided by the described systems and methods. Thus, the described systems and methods are more efficient, meet desired goals more effectively, and produce products and perform processes more consistently than traditional systems and techniques.

FIG. 1 illustrates a method for recommending a setting for a control based upon historical information. At 101 the system may obtain historical information for equipment having at least one control that controls an operational setting of the equipment. A control may include a knob, valve, digital control, analog control, or any other type of control that can be adjusted to change operational settings. An operational setting includes any setting of the machine or equipment that can control different variables or attributes of the machine or produced product. For example, an operational setting may include a temperature setting, product smoothness value, product throughput setting, fluid level setting, pressure setting, energy efficiency, vibration value, and the like.

The historical information indicates a setting for the controls of the equipment, for example, the control setting that was set by an operator while the equipment was in manual mode or the control setting that was set by the system while the equipment was in automatic mode. The historical information also identifies the operating performance of the equipment while the controls were set at these settings. The operating performance indicates the attributes of the equipment and/or product that were attained while the equipment controls were set at the identified settings. For example, the operating performance may include product smoothness, energy efficiency of the machine, a vibration value, a size with respect to a tolerance of the product, product throughput, fineness of the material, and the like.

The historical information is used by the system to identify recommended control settings for the equipment based upon goals of the operator and exogenous factors. Accordingly, the historical information may also identify other information, for example, exogenous factors that were present during capture of the historical information. For example, the historical information may include information related to upstream and downstream equipment. For example, the information related to upstream and downstream equipment may include material output by upstream equipment, ability to process product by downstream equipment, attributes of the product produced by upstream equipment, requirements of downstream equipment, and the like. The historical information may include other information related to exogenous factors, for example, the operating temperature of the equipment, environmental humidity, and the like. Other exogenous factors will be described in more detail below and may also be included in the historical information. The historical information may be multi-variate time-series information of observed and controlled variables from equipment. The system may also receive additional information in conjunction with the historical information. For example, the system may receive information related to the current readings of the equipment.

At 102 the system may receive a goal for the equipment that is related to a desired operating performance of equipment. The desired operating performance may be any of the operating performances identified above. Additionally, the goal may identify more than one desired operating performance. If the goal identifies more than one desired operating performance, the goal may identify priorities for the operating performances within the goal. For example, if the goal identifies energy efficiency and product throughput, the goal may also identify which of these is a higher priority. Thus, when the system has to a choose between a control setting that has a better energy efficiency, but a worse product throughput, the system can use the priority identification to determine whether to choose that control setting.

At 103 the system may identify, from the obtained historical information, a plurality of sets of contiguous good reference segments. A segment is a point in the historical information having an identified control setting and operating performance. Good reference segments include segments where the desired operating performance was achieved. A set of contiguous good reference segments includes a plurality of good reference segments that occur over a predetermined period of time. To identify the plurality of sets of contiguous good reference segments, the system may look at the spread of the goal variable in the historical information. In other words, the system looks at the historical information in view of the identified goal(s). If the spread is low, the system identifies the reference segment as good. Higher spreads may be classified as normal or bad segments. The system then classifies these segments based upon the performance level, for example, as good segments, bad segments, normal segments, and the like.

The system may then cluster the segments into clusters based upon the performance level and based upon the length of time that the performance level was obtained. For example, using energy efficiency as the operating performance, the system may cluster segments when the energy efficiency has exceeded a predetermined threshold for a predetermined length of time. In grouping the segments, the system may perform a moving average computation on the historical information to smooth any local fluctuations. The system may then represent the runs having similarities in operating conditions for different runs as a graph.

Figure 2:
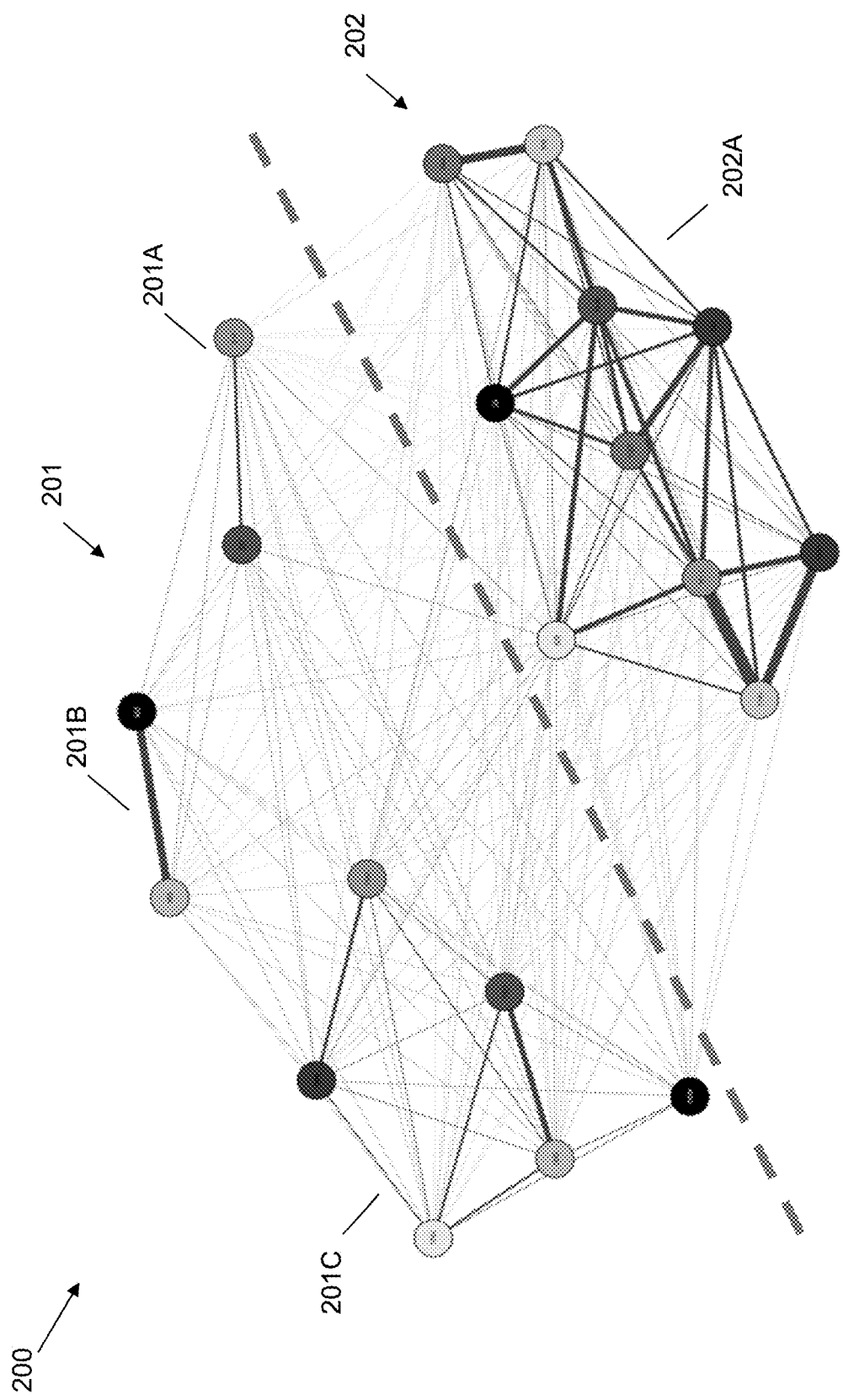
FIG. 2 illustrates an example of performance segmentation.

FIG. 2 illustrates an example run-closeness graph at 200. The segments identified as good are illustrated above the dotted line at 201. The segments identified as bad or normal are illustrated below the dotted line at 202. The segments are then filtered based upon the length of time that the performance level was achieved. The segments are then subsequently clustered at 201A, 201B, and 201C for the good segments and 202A for the bad and normal segments.

At 104 the system may identify, from the identified plurality of sets, a subset of sets that are achievable from the current operating state of the equipment. An achievable segment or set of segments includes segments or sets of segments where the controls could be adjusted to actually reach the setting or performance represented by the segment or set of segments. In other words, based upon a current operating state of the equipment, not all operational settings represented by the reference segments are possible to move to by changing the controls. Thus, the system identifies those reference segments that are achievable from the current operating state. The achievable reference segments may include those having a similarity to the current operating state of the equipment. To identify the achievable segments, the system may remove all the bad or normal run segments. In other words, the system may filter the good runs in the similarity graph. The system may then cluster the good run segments based upon similarity scores between the segments. The system may also identify a representative element for each cluster that is a good reference point or operating setting for the equipment.

At 105 the system may determine if there is a reference segment out of the identified subset of sets that is attainable based upon exogenous factors related to an operating environment of the equipment. The exogenous factors may include those factors previously identified. Exogenous factors may include constraints on the equipment, for example, constraints due to the upstream equipment states, operating conditions of upstream equipment, operating condition of downstream equipment, availability of various raw materials at distinct points in the time horizon, temperature of the equipment, reusability of the upstream process output, and the like. Other exogenous factors may include environmental conditions, for example, environmental temperatures, environmental humidity, geographic location of the equipment, climatic condition of the region, and the like.

Figure 3:
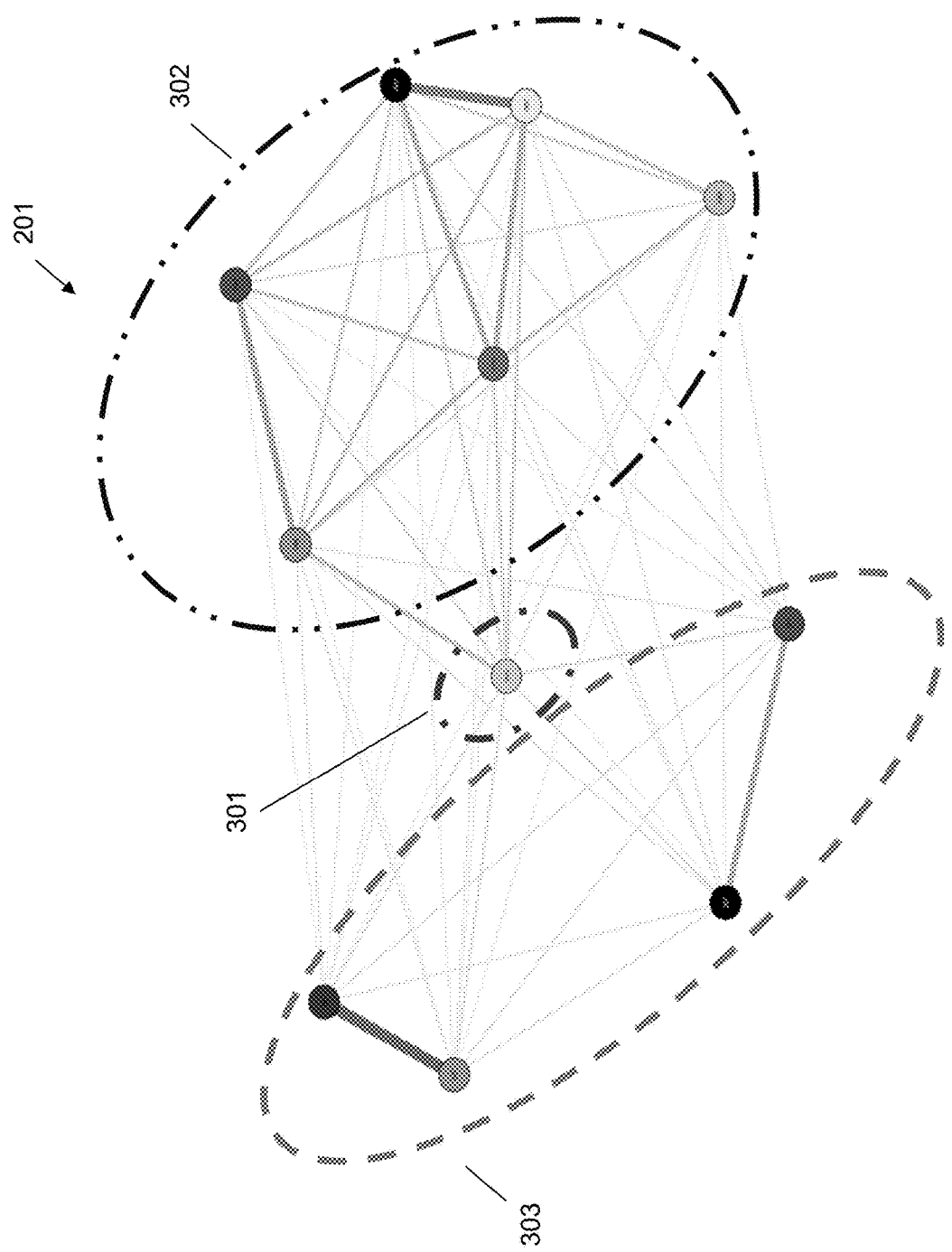
FIG. 3 illustrates an example of attainable reference point segmentation based upon exogenous factors.

To select a reference segment, the system may add the current operating state to the run-closeness graph. The system may then show the similarity of the current operating condition with each of the reference clusters. To select the attainable reference segment the system may calculate a distance between the current operating state and the sets of segments included in the subset. The system then performs the distance calculation and selects the reference segment having the lowest distance calculation. For example, FIG. 3 illustrates a run-closeness graph illustrating the good segments 201. The reference point 301 is added to the graph. The system then calculates the distance calculation between the two groups of attainable reference segments 302 and 303.

If the system cannot identify a segment as attainable based upon the exogenous factors, the system may operate in another operational mode or provide a recommendation of an attainable reference segment that is as close as possible to the current operating system at 107. If the system can identify a segment as attainable based upon the exogenous factors, the system may provide a recommendation to an operator at 106. The recommendation may identify a setting for the control to obtain the desired goal from the selected reference segment. Specifically, since the reference segment is associated with a control setting, the recommended setting includes the control setting associated with the reference segment. The recommended control setting may correspond to the reference segment having a lowest similarity score with respect to the similarity or distance calculation of the subset.

Accordingly, the systems and methods as described herein provide techniques that can to analyze historical data for a machine or equipment and look at exogenous factors to provide a recommendation for control settings based upon goals of the operator, which is not possible using with traditional systems and techniques. Thus, the described systems and methods are more efficient, meet desired goals more effectively, and produce products and perform processes more consistently than traditional systems and techniques.

Figure 4:
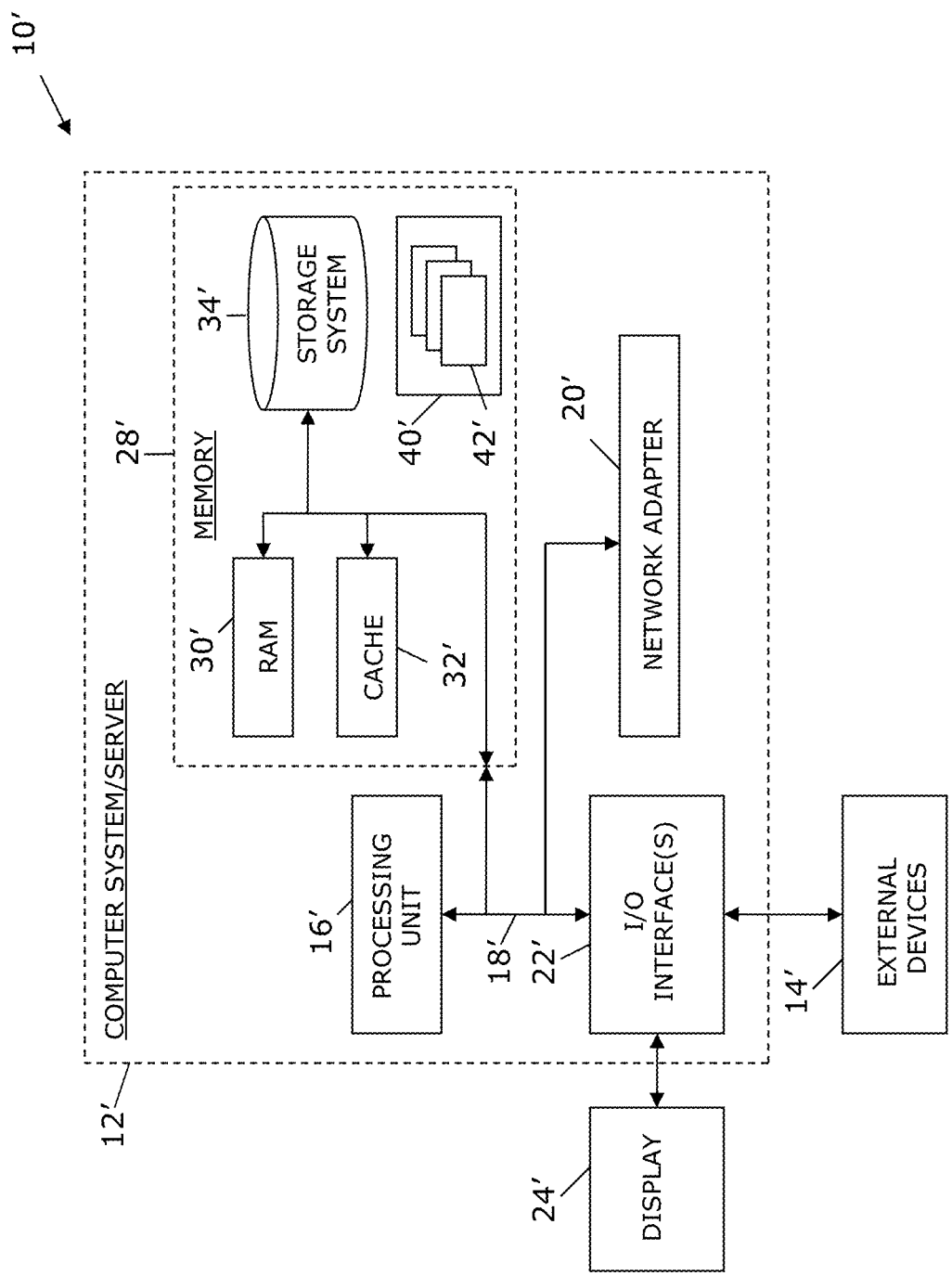
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:

obtaining historical information for equipment having at least one control that controls an operational setting of the equipment, wherein the historical information indicates a setting for the at least one control during operation of the equipment and identifies an operating performance of the equipment corresponding to the indicated setting, wherein the operating performance identifies attributes of products produced by the equipment while the equipment operated at the indicated setting, wherein the historical information further comprises exogenous factors occurring during the indicated setting and the operating performance;

receiving a goal for the equipment, wherein the goal is related to a desired operating performance of the equipment, wherein the desired operating performance comprises a desired attribute of a product to be produced by the equipment;

identifying, from the obtained historical information, a plurality of sets of contiguous good reference segments, wherein a contiguous set of good reference segments comprises a plurality of operating time segments, wherein each of the operating time segments comprises an identified control setting and comprises a segment of time where the desired operating performance was achieved for a predetermined of time, wherein the identifying comprises identifying a spread of a goal variable within the historical information and identifying good reference segments as those having a low spread and clustering segments into sets based upon a performance level identified from the spread of a goal variable within the historical information and a length of time the performance level was obtained;

identifying, from the identified plurality of sets, a subset of sets comprising reference segments that are achievable from a current operating state of the equipment, wherein reference segments that are achievable comprise reference segments corresponding to control settings that are possible for the equipment in view of the current operating state of the equipment;

selecting, from the identified subset, a reference segment that is attainable based upon current exogenous factors related to a current operating environment of the equipment, wherein the selecting comprises computing, using a distance calculation, a similarity between a current operating state of the equipment and the reference segment corresponding to each of the sets within the subset of sets, wherein the selecting a reference segment that is attainable comprises selecting a reference segment having a lowest distance from the current operating state of the equipment; and providing a recommendation to an operator of the equipment, wherein the recommendation identifies a setting for the control to obtain the goal, the setting being determined from the control settings corresponding to the selected reference segment.

2. The method of claim 1, wherein the historical information comprises multi-variate time-series data.

3. The method of claim 1, wherein the identifying a plurality of sets of contiguous good reference segments comprises clustering the historical information into clusters based upon performance of the equipment.

4. The method of claim 3, wherein the clustering comprises performing a moving average computation on the historical information.

5. The method of claim 3, wherein the identifying a plurality of sets of contiguous good reference segments comprises representing the clustered historical information as a run-closeness graph.

6. The method of claim 1, wherein the selecting a reference segment comprises clustering the identified subset of sets, based upon a similarity score between segments within the sets.

7. The method of claim 6, wherein the selecting a reference segment comprises determining a similarity score between the clustered identified subsets and the current operating state.

8. The method of claim 7, wherein the providing a recommendation comprises providing a recommendation of a control setting corresponding to the reference segment having the lowest similarity score.

9. The method of claim 1, wherein the exogenous factors comprise at least one exogenous factor selected from the group consisted of: environmental temperature, an operating condition of upstream equipment, an operating condition of downstream equipment, geographic location of the equipment, and availability of equipment materials.

10. An apparatus, comprising:

at least one processor; and a non-transitory computer readable storage medium having computer readable program code embodied therewith and executable by the at least one processor, the computer readable program code comprising:

computer readable program code configured to obtain historical information for equipment having at least one control that controls an operational setting of the equipment, wherein the historical information indicates a setting for the at least one control during operation of the equipment and identifies an operating performance of the equipment corresponding to the indicated setting, wherein the operating performance identifies attributes of products produced by the equipment while the equipment operated at the indicated setting, wherein the historical information further comprises exogenous factors occurring during the indicated setting and the operating performance;

computer readable program code configured to receive a goal for the equipment, wherein the goal is related to a desired operating performance of the equipment, wherein the desired operating performance comprises a desired attribute of a product to be produced by the equipment;

computer readable program code configured to identify, from the obtained historical information, a plurality of sets of contiguous good reference segments, wherein a contiguous set of good reference segments comprises a plurality of operating time segments, wherein each of the operating time segments comprises an identified control setting and comprises a segment of time where the desired operating performance was achieved for a predetermined of time, wherein the identifying comprises identifying a spread of a goal variable within the historical information and identifying good reference segments as those having a low spread and clustering segments into sets based upon a performance level identified from the spread of a goal variable within the historical information and a length of time the performance level was obtained;

computer readable program code configured to identify, from the identified plurality of sets, a subset of sets comprising reference segments that are achievable from a current operating state of the equipment, wherein reference segments that are achievable comprise reference segments corresponding to control settings that are possible for the equipment in view of the current operating state of the equipment;

computer readable program code configured to select, from the identified subset, a reference segment that is attainable based upon current exogenous factors related to a current operating environment of the equipment, wherein the selecting comprises computing, using a distance calculation, a similarity between a current operating state of the equipment and the reference segment corresponding to each of the sets within the subset of sets, wherein the selecting a reference segment that is attainable comprises selecting a reference segment having a lowest distance from the current operating state of the equipment; and computer readable program code configured to provide a recommendation to an operator of the equipment, wherein the recommendation identifies a setting for the control to obtain the goal, the setting being determined from the control settings corresponding to the selected reference segment.

11. A computer program product, comprising:

a non-transitory computer readable storage medium having computer readable program code embodied therewith, the computer readable program code executable by a processor and comprising:

computer readable program code configured to obtain historical information for equipment having at least one control that controls an operational setting of the equipment, wherein the historical information indicates a setting for the at least one control during operation of the equipment and identifies an operating performance of the equipment corresponding to the indicated setting, wherein the operating performance identifies attributes of products produced by the equipment while the equipment operated at the indicated setting, wherein the historical information further comprises exogenous factors occurring during the indicated setting and the operating performance;

computer readable program code configured to receive a goal for the equipment, wherein the goal is related to a desired operating performance of the equipment, wherein the desired operating performance comprises a desired attribute of a product to be produced by the equipment;

computer readable program code configured to identify, from the obtained historical information, a plurality of sets of contiguous good reference segments, wherein a contiguous set of good reference segments comprises a plurality of operating time segments, wherein each of the operating time segments comprises an identified control setting and comprises a segment of time where the desired operating performance was achieved for a predetermined of time, wherein the identifying comprises identifying a spread of a goal variable within the historical information and identifying good reference segments as those having a low spread and clustering segments into sets based upon a performance level identified from the spread of a goal variable within the historical information and a length of time the performance level was obtained;

computer readable program code configured to identify, from the identified plurality of sets, a subset of sets comprising reference segments that are achievable from a current operating state of the equipment, wherein reference segments that are achievable comprise reference segments corresponding to control settings that are possible for the equipment in view of the current operating state of the equipment;

computer readable program code configured to select, from the identified subset, a reference segment that is attainable based upon current exogenous factors related to a current operating environment of the equipment, wherein the selecting comprises computing, using a distance calculation, a similarity between a current operating state of the equipment and the reference segment corresponding to each of the sets within the subset of sets, wherein the selecting a reference segment that is attainable comprises selecting a reference segment having a lowest distance from the current operating state of the equipment; and computer readable program code configured to provide a recommendation to an operator of the equipment, wherein the recommendation identifies a setting for the control to obtain the goal, the setting being determined from the control settings corresponding to the selected reference segment.

12. The computer program product of claim 11, wherein the identifying a plurality of sets of contiguous good reference segments comprises clustering the historical information into clusters based upon performance of the equipment.

13. The computer program product of claim 12, wherein the clustering comprises performing a moving average computation on the historical information.

14. The computer program product of claim 12, wherein the identifying a plurality of sets of contiguous good reference segments comprises representing the clustered historical information as a run-closeness graph.

15. The computer program product of claim 11, wherein the selecting a reference segment comprises clustering the identified subset of sets, based upon a similarity score between segments within the sets.

16. The computer program product of claim 15, wherein the selecting a reference segment comprises determining a similarity score between the clustered identified subsets and the current operating state.

17. The computer program product of claim 16, wherein the providing a recommendation comprises providing a recommendation of a control setting corresponding to the reference segment having the lowest similarity score.

18. A method, comprising:

obtaining historical information of equipment identifying (i) settings for controls that control operational settings of the equipment and (ii) operating parameters of the equipment corresponding to the identified settings, wherein the historical information further identifies attributes of products produced by the equipment while the equipment operated at the identified settings and exogenous factors occurring during the identified settings and the operating parameters;

receiving an operating parameter goal for the equipment, wherein the operating parameter goal identifies a desired attribute of a product to be produced by the equipment;

grouping segments of the historical information into performance groups based upon the identified operating parameter goal, each of the segments comprising an identified control setting during a given segment;

identifying a subset of the grouped segments (i) corresponding to the desired attribute and (ii) corresponding to segments that are reachable from a current operating state of the equipment, wherein the identifying comprises identifying a spread of a goal variable within the historical information and identifying good segments as those having a low spread and clustering segments into sets based upon a performance level identified from the spread of a goal variable within the historical information and a length of time the performance level was obtained, wherein segments that are reachable comprise good segments corresponding to control settings that are possible for the equipment; and providing a recommendation for a setting for the control based upon the operating parameter goal, wherein the providing a recommendation comprises selecting a segment from the identified subset that is attainable based upon operating environment factors of the equipment, wherein the selecting comprises computing, using a distance calculation, a similarity between a current operating state of the equipment and the segment of the identified subset, wherein the selecting a segment that is attainable comprises selecting a segment having a lowest distance from the current operating state of the equipment, wherein the recommendation for a setting is determined from the setting corresponding to the selected segment.

* * * * *